Sept. 24, 1957   B. W. BADENOCH   2,807,241
POWER TRANSMISSION
Filed Sept. 7, 1954   2 Sheets-Sheet 1

*INVENTOR.*
BENJAMIN W. BADENOCH
BY
Ralph L. Tweedale

Sept. 24, 1957  B. W. BADENOCH  2,807,241
POWER TRANSMISSION

Filed Sept. 7, 1954  2 Sheets-Sheet 2

INVENTOR.
BENJAMIN W. BADENOCH
BY
Ralph L. Tweedale

United States Patent Office 2,807,241
Patented Sept. 24, 1957

2,807,241
POWER TRANSMISSION

Benjamin W. Badenoch, Pleasant Ridge, Mich., assignor to Vickers Incorporated, Detroit, Mich., a corporation of Michigan Application September 7, 1954, Serial No. 454,362

11 Claims. (Cl. 121—46.5)

This invention relates to power transmissions, and is particularly applicable to those of the type comprising two or more fluid pressure energy translating devices, one of which may function as a pump and another as a fluid motor.

The invention is primarily concerned with hydraulic transmissions of the type recited having servo mechanism incorporated therein and in particular is concerned with providing a constant gain servo mechanism control device.

In hydraulic servo control systems the servo control valve may be utilized both as a directional control valve and a power control valve and is linked with the motor to provide a follow-up action. The servo valve functions as a power control valve by metering fluid in desired quantities which vary with the deflection of the valve from neutral position.

In systems where the load varies, the gain of the valve will vary. Gain of the servo valve may be defined to mean the slope of the flow versus deflection curves. The gain of the valve and thus its sensitivity will depend upon the pressure drop across the valve. At high load the pressure drop is low causing it to be relatively insensitive and the gain of the valve is low. When the pressure drop is relatively high across the throttle of the servo valve, the valve will be extremely sensitive and the gain of the valve is high. The large variations in gain in any one particular system may thus vary from extreme sluggishness to extreme instability.

Power control devices have been devised to provide constant gain servo control systems. One type of device comprises a variable throttle responsive to the pressures across the servo valve throttle for maintaining a substantially constant pressure drop thereacross. As the device provides a substantially constant pressure drop across the servo valve throttle for any given deflection or opening of the servo valve throttle the gain of the valve is maintained constant regardless of load conditions. Another type of constant gain power control device which has been devised comprises a double throttling device which simultaneously meters fluid to and from the motor and maintains the pressure drop across the servo valve throttle constant to maintain the gain of the valve constant for any deflection of the servo valve throttle and despite variable load conditions.

The power control device may be separated from the servo valve and when space requirements are important, such as in aircraft use, special bodies have been provided for mounting the servo valve on the power control device. However, because of linkage problems involved it is desired in some aircraft to utilize a rotary servo valve while in others it is desirable to utilize a linear motion type of servo valve and it has been conventional practice to provide two different types of power control device bodies for the mounting of the two different types of servo control valves. The valve bodies or housings for mounting therein the constant gain power control device mechanism have been specially constructed for also mounting thereon one particular type of servo control valve. Thus because different types of servo control valves were used, depending on the installation problems involved, each type of power control device has been designed and constructed independently and differently from the other without regard to economies of manufacture which would ensue if they were constructed from identical basic parts.

It is therefore an object of this invention to provide an improved power control device to produce a constant gain servo control system.

It is another object of this invention to provide a constant gain power control device upon which may be mounted a servo control valve of either the rotary or linear motion type.

It is a further object of this invention to provide an improved constant gain power control and servo mechanism device which is adapted for low cost manufacture and suitable for a multiplicity of servo control applications.

Further objects and advantages of the present invention will be apparent from the following description, reference being had to the accompanying drawings wherein a preferred form of the present invention is clearly shown.

Figures 1, 10:
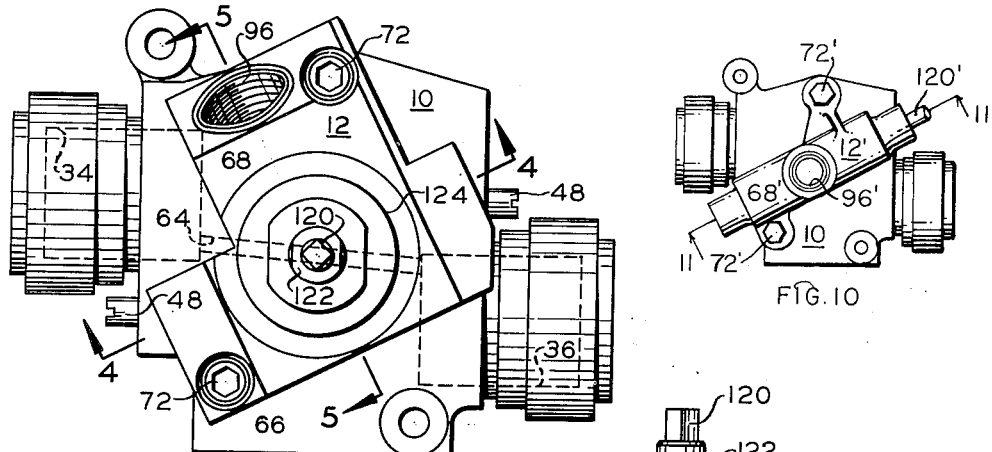
Figure 1 is a top view of a preferred form of the present invention.
Figure 10 is a top view of the form of the present invention shown in Figure 9.
Figures 3, 11:
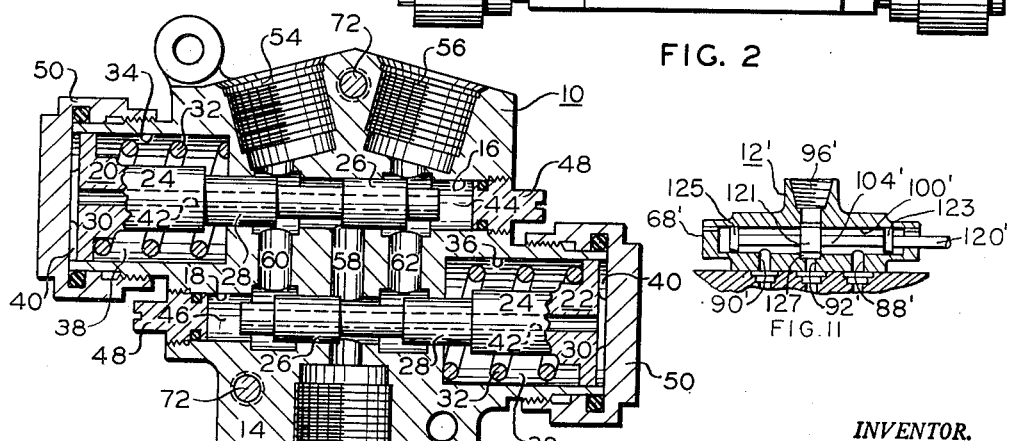
Figure 3 is a sectional view taken on line 3—3 of Figure 2.
Figure 11 is a sectional view of the linear type of servo control valve illustrated in Figures 9 and 10 and taken on line 11 of Figure 10.
Figure 4:
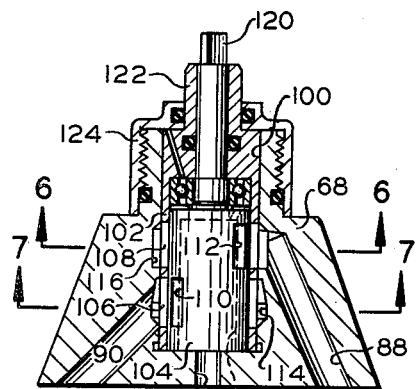
Figure 4 is a view taken on line 4—4 of Figure 1.

Referring now to Figures 1 and 3 there is shown a constant gain power control device indicated generally by the numeral 10 upon which is mounted a rotary servo valve 12 shown in more detail in Figure 4. The power control device 10 comprises a body or housing member 14 having a pair of parallel longitudinally constructed bores 16 and 18 extending completely through the housing and having respectively mounted therein duplicate power control valves indicated generally by the numerals 20 and 22.

As the power control valves are duplicates, only one will be described and the numerals relating to the parts of one may be applied to indicate the parts of the other. Each power control valve comprises a control piston 24 having metering lands 26 and 28 and a pressure responsive operating piston 30 biased by a spring 32 of predetermined resistance which determines the pressure drop across a servo valve throttle later to be described. The bores 16 and 18 have oppositely arranged enlarged end sections indicated respectively by the numerals 34 and 36 in which the operating pistons are slidably mounted to form fluid chambers 38 and 40 on the opposite sides of each piston, the springs 32 being mounted in the chambers 38. A longitudinal passage 42 extends completely through each control and operating piston which is adapted to conduct fluid from the smaller ends 44 and 46 respectively of the bores 16 and 18 to the chamber 40 of each power control valve. The bores 16 and 18 are closed at their smaller ends by duplicate threaded plug members 48 and at their larger ends by threaded closure members 50.

The body or housing 14 has an inlet connection port 52 adapted for connection to a pressure fluid source and motor ports 54 and 56 adapted for connection to a servo motor. A vertical centrally located pressure delivery passage 58 leading from the inlet port 52 intersects both of the power control valve bores 16 and 18. The motor ports 54 and 56 have vertical motor passages 60 and 62 leading therefrom which intersect the bores 16 and 18 on opposite sides of the vertical passage 58. The spring chambers 38 of the power control valves are connected to each other by a diagonal passage 64, shown in dotted lines in Figure 1, which is connected to tank in a manner to be subsequently explained.

Figures 2, 9:
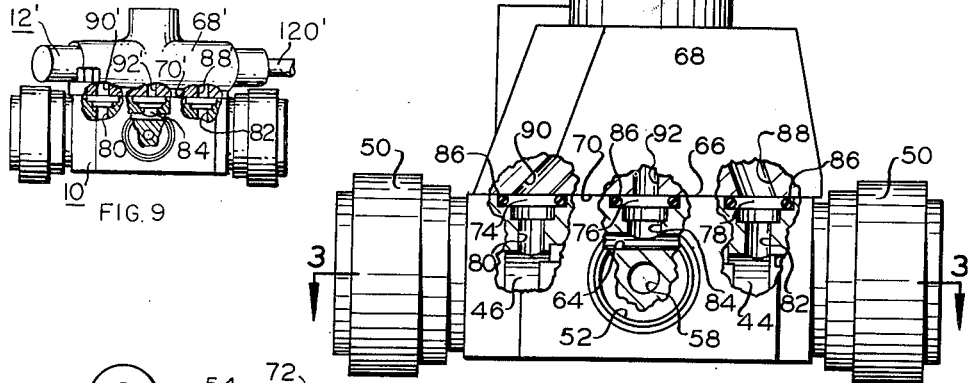
Figure 2 is a side view of a preferred form of the present invention.
Figure 9 is a side view of another form of the present invention illustrating a linear rather than a rotary type of servo control valve mounted on the same power control device shown in Figure 2.
Figure 5:
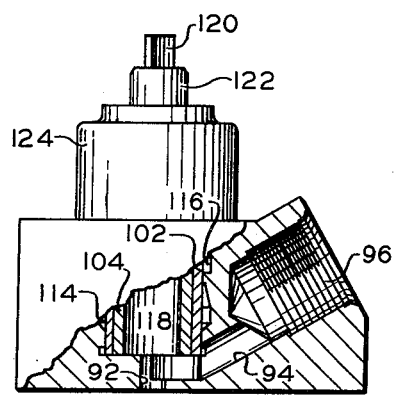
Figure 5 is a sectional view taken on line 5—5 of Figure 1.

Referring now to Figures 2 and 3, one side of the body 14 of the power control device 10 is provided with a flat surfaces indicated by the numeral 66. This surface is adaptable for mounting thereon servo control valves of different types such as the servo control valve 12, the body 68 of which is provided with a mating flat surface 70, or a linear type of servo control valve 12' disclosed in Figures 9, 10 and 11, the body 68' of which is provided with a similar mating flat surface 70'. The servo valve bodies 68 or 68' may be connected to the power control device body 14 by means of bolts 72 or 72' as shown in Figures 1 and 3 or Figure 10. The power control device body 14 has three ports 74, 76, and 78 opening to the flat surface 66 of the body adapted to cooperate with mating ports of the servo valve body 68 or 68'. The ports 74 and 78 are directly connected respectively by passages 80 and 82 to the end chambers 46 and 44 of the power control valves 22 and 20. The port 76 is directly connected to the diagonal passage 64 by a passage 84. Sealing rings 86 are placed in the counter bores forming the ports for proper sealing between the adjoining mating surfaces and ports of the power control device body and the servo control valve body. The ports 74 and 78 and connecting passages 80 and 82 perform as return passages for motor displacement. A suitable pressure fluid source is adapted to be connected to the pressure port 52 of the power control device and will be conducted to and from the motor through the ports 54 or 56, dependent upon the operational position of the servo control device. The directional operation of the motor is controlled by the servo valve in blocking either the port 54 or port 56 from a return source. When fluid is conducted to the motor through power control device port 54, displacement from the motor directed to external connection port 56 is conducted to the end chamber 44 and by means of passage 82 and port 78 either to a motor return passage 88 in the servo valve 12 opening to the flat surface 70 of the servo valve body as shown in Figure 2 or to a similar function motor return passage 88' which opens to the flat surface 70' of the servo valve body 68' as shown in Figure 9. When fluid is conducted to the motor through power control device port 56, displacement from the motor entering external motor connection port 54 is conducted to chamber 46 and by means of passage 80 and port 74 either to a motor return passage 90 opening to the flat surface 70 of the servo valve 12 as shown in Figure 2 or to a similar function motor return passage 90' which opens to the flat surface 70' of the servo valve 12' as shown in Figure 9. The passage 84 which is connected to the diagonal passage 64, is adapted to continuously connect the spring chambers 38 of the power control valves 20 and 22 to tank. This is accomplished by providing a tank passage 92 in the servo valve device 12, shown in Figures 2, 4, and 5, which opens to the flat surface 70 and mates with the tank port 76 of the power control device body 66. The tank passage 92 of the servo valve device 12 is connected by a branch angular tank passage 94 to an external connection tank port 96 of the servo valve device. A similar function tank passage 92' is provided in the servo valve 12', shown in Figures 9 and 11, which opens to the flat surface 70' of the valve body 68' and which is also adapted to mate with the tank port 76 of the power control valve. The tank passage 92' is continuously connected to a tank connection port 96' of the valve.

The servo valve 12 comprises the body or housing member 68 having a bore 100 extending completely therethrough, the lower portion of which comprises the tank passage 92. A sleeve 102 is slidably or rotatably mounted in the bore 100 and has rotatably mounted therein a plug or hollow valve piston member 104. The sleeve is provided with two sets of spaced apart ports 106 and 108 extending completely through the wall of the sleeve which are adapted to cooperate respectively with two spaced apart sets of side ports 110 and 112 respectively in the piston member 104 for returning motor displacement to a tank. The sleeve ports 106 open at their outer ends to an enlarged portion 114 of the bore 100 while the sleeve ports 108 open to an enlarged portion 116 of the bore 100. Angular motor return passage 90 leads to the enlarged portion 114 while angular motor return passage 88 leads to the enlarged portion 116. Displacement from the motor in one direction of operation is adapted to be throttled over the plug and sleeve ports 110 and 106 to a hollow portion 118 of the plug which opens to tank passage 92 or in the opposite direction of operation of the motor is adapted to be throttled over the plug and sleeve ports 112 and 108 to the hollow portion 118.

Figure 6:
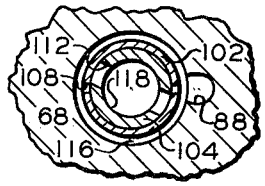
Figure 6 is a partial sectional view taken on line 6—6 of Figure 4.
Figure 7:
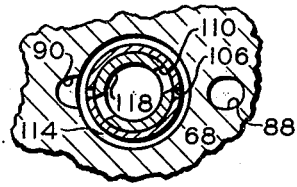
Figure 7 is a partial sectional view taken on line 7—7 of Figure 4.

As shown more clearly in Figures 6 and 7, the sleeve and plug ports may be closed from communication with each other in the neutral position of the valve. In some applications it is preferable to permit a slight communication between the ports to permit a continuous fluid flow through the power control valves in order to continually maintain the same in the throttling regulating position. Clockwise rotation of the plug, as viewed in Figures 6 and 7 by means of an external operating extension 120 thereof connects the plug and sleeve ports 110 and 106 respectively to each other while closing communication between the plug and sleeve ports 112 and 108. Counterclockwise rotation of the plug results in reversing the communication and blocking of the plug and sleeve ports previously mentioned.

The plug 104 of the rotary servo valve may be rotated relative to the sleeve 102 to provide increments of opening between the plug and sleeve ports and thus provide a variable throttle through which motor displacement must pass in either direction of motor operation and the pressure drop across which is controlled by one or the other of the power control valves 20 or 22. Referring now to Figures 9 and 11, the linear type of servo control valve 12' is provided with a control valve stem 120' adapted for actuation of a control valve spool 104' shiftably mounted within a longitudinal bore 100' of the servo valve body 68' for control of ports and passages thereof in the well known manner. For this purpose, the valve spool 104' has a center land 121 between two end lands 123 and 125. When the valve spool 104' is in the neutral position shown, the motor passages 88' and 90' which lead directly to the valve bore 100' are blocked by center land 121 from communication with the tank port 96' which is connected directly to a centrally located enlarged valve bore port 127. When the valve spool 104' is shifted rightwardly from the neutral position shown, displacement from the motor may flow through motor passage 90' to tank port 96' while motor passage 88' is blocked from tank port 96'. When valve spool 104' is shifted leftwardly from the neutral position, motor displacement may flow from motor passage 88' to the tank port 96' while motor passage 90' is blocked from communication with the tank port. Tank passage 92′, which is adapted to mate with power control valve port 76, is connected directly to the enlarged valve bore port 127 for the purpose of continuously connecting the spring chambers of the two power control valves to the tank port 96′.

The spool 104′ of the linear type servo valve 12′ may be shifted relative to the body thereof to provide increments of opening forming a variable throttle between the center land 121 and the enlarged port 127 through which motor displacement must pass in either direction of motor operation. The pressure drop across the variable throttle is controlled in the same manner as that of the rotary servo valve throttle by the power control valves. The circuit provided in the power control device 10 and servo valve 12 or 12′ results in fluid being conducted to the motor through the power control device and being metered across one of the lands of one of the power control valves to the motor while displacement from the motor is returned through the power control device across the remaining throttling land of the same power control valve and thence to the servo valve 12 or 12′ and across the throttle provided therein to the tank. One power control valve is effective as described in one direction of motor operation while the other power control valve is effective in the opposite direction of motor operation. The power control valve is responsive to the pressures across the variable throttle of servo valve 12 or 12′ to maintain a constant pressure drop thereacross for every opening thereof and thus is adapted to maintain the gain of the valve constant for every given deflection or opening thereof. The sleeve 102 of the rotary servo valve 12 is provided with a portion 122 extending from the body 68 thereof adapted to be linked to the motor and actuated thereby to produce a follow-up action to return the valve to a motor stopping position. The extending portion 120 of the plug 104 may be suitably pin connected to the plug for actuation of the same and a cover or cap 124 is provided which may be threaded on the servo valve body to maintain the sleeve and plug within the servo valve body.

Figure 8:
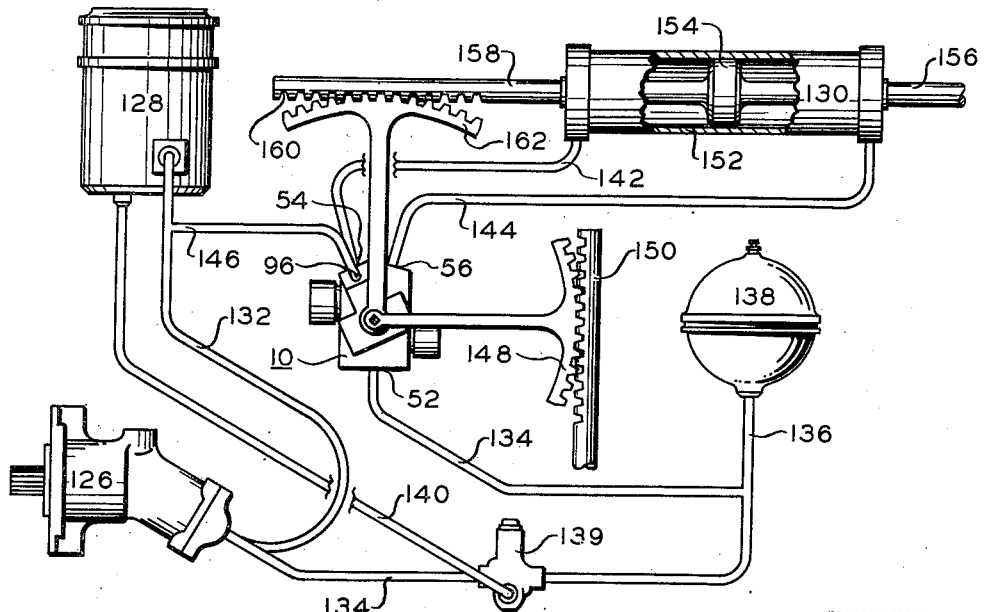
Figure 8 is a diagrammatic view of a hydraulic servo control system embodying a preferred form of the present invention.

Referring now to Figure 8 there is shown a hydraulic circuit comprising a pump 126 which is supplied with fluid from a reservoir 128 and the delivery from which is connected to a cylinder and piston motor 130. The inlet side of the pump 126 is connected to the tank 128 by a conduit 132 while the outlet side of the pump is connected by a pressure delivery conduit 134 to the pressure delivery port 52 of the power control device 10. A branch conduit 136 connects the pressure delivery conduit 134 to an accumulator 138 and a pressure regulating or unloading valve 139 is incorporated in the pressure delivery conduit 134 which exhausts fluid to the tank 128 by a conduit 140 whenever a predetermined pressure arises in the accumulator. The motor ports 54 and 56 of the power control device 10 are respectively connected by conduits 142 and 144 to opposite ends of the motor 130. The tank port 96 of the servo control valve 12 is connected to the tank 128 by a conduit 146 leading to the supply conduit 132. The extended portion 120 of the plug 104 is illustrated as being fastened to a gear segment member 148 which in turn is meshed with a rack input member 150 for selective operation of the servo valve plug. The motor 130 comprises a cylinder 152 having a fluid operated piston 154 mounted therein having piston rods 156 and 158 associated therewith and extending from opposite ends of the motor for the purpose of driving a load device such as an aircraft control surface, not shown. The piston rod 158 may be provided with a rack 160 in mesh with a gear segment 162 suitably fastened to the extended portion 122 of the sleeve 102 for providing a follow-up action of the sleeve.

It should be understood that the linear type of servo valve 12′ may be substituted for the servo valve 12 in which case the motor passages 88′ and 90′ will respectively register with the motor ports 78 and 74 of the power control valve while the tank passage 92′ will register with the power control valve tank port 76. The tank port 96′ of the servo valve 12′ will be connected to the tank 128 by the conduit 146. It should also be understood that in the following description of operation of the rotary servo valve 12 that the linear type of servo valve 12′ will perform the same functions thereof and that the neutral position of the servo valve 12′ as disclosed in Figure 11 corresponds to the neutral position of the servo valve 12 disclosed in Figures 6 and 7. If the control valve spool 104′ is shifted rightwardly, the function and operation of the valve 12′ corresponds to that of the rotary servo valve 12 when the plug 104 thereof is rotated clockwise, i. e., motor passage 80 and port 74 of the power control valve will be in communication with the tank by means of passage 90′, 92′ and tank port 96′ of valve 12′. If the control valve spool 104′ is shifted leftwardly, the function and operation of the servo valve 12′ corresponds to that of the rotary servo valve 12 when the plug 104 thereof is rotated counterclockwise, i. e., motor passage 82 and motor port 78 of power control valve 10 will be in communication with the tank by means of passage 88′, 92′ and tank port 96′ of servo valve 12′.

In operation with the pump being driven from a prime mover such as an aircraft engine, not shown, and with the servo valve in a neutral position as shown in Figures 6 and 7, the displacement from pump 126 will be unloaded over the valve 139 to tank 128 by means of conduits 134 and 140. If the plug 104 is rotated clockwise, as viewed in Figures 6 and 7, the plug ports 110 will be in communication with sleeve ports 106 and the plug ports 112 will be blocked from communication with sleeve ports 108. The degree of rotation of the plug 104 will determine the size of opening between the sleeve and plug ports and consequently the size of the throttle opening created.

In the operating position of the servo valve stated the motor port 54 of the power control device 10 is open to tank 128 while the motor port 56 thereof is blocked from communication with the tank. Fluid is conducted from the pressure fluid source through conduit 134 to the pressure inlet port 52 of the power control device 10, and by means of passage 58, bore 18, passage 62, bore 16, and motor port 56 to the right end of motor 130 by means of conduit 144. The piston 154 of the motor is operated leftwardly and the displacement from the motor is conducted by conduit 142 to the motor port 54 of power control device 10, and thence by means of passage 60 across bore 16 to the chamber 46 at the extreme end of bore 18. Motor displacement is then conducted by passage 80 to the motor return port 74 opening to the flat surface 66 of the power control device body 14, and by means of passage 90 of the servo valve body 68 opening to the flat surface 70 thereof to the enlarged portion 114 of bore 100. Motor displacement is thence conducted to tank 128 by the sleeve ports 106, the plug port 110, hollow portion 118 of plug 104, passages 92 and 94, tank port 96, and conduits 146 and 132. During this operation power control valve 22 is effective to meter fluid to the motor and from the motor ahead of the servo valve and to also maintain a constant pressure drop across the throttling ports of the servo valve device 12 in order to maintain the gain of the valve constant for every given opening of the throttling ports.

Power control valve 20 is operated to the closed position and remains ineffective in this direction of motor operation because of the high pressure differential across the motor transmitted to opposite sides of the operating piston 30 thereof which is greater than the resistance of the spring 32. The inlet side of the motor is connected to chamber 40 of power control valve 20 by means of passage 62, chamber 44 and the longitudinal passage 42 in the control piston. As the spring chamber 38 on the opposite side of operating piston 30 is connected to tank beyond the servo valve throttle, the high pressure differential causes the power control valve 20 to close and become ineffective.

The operating piston 30 of power control valve 22 has transmitted thereto the pressure ahead of the servo valve throttle in the motor return line by means of motor port 54, passage 60 across the enlarged portion of bore 16, chamber 46, and longitudinal control piston passage 42 leading to chamber 40. The opposite side of the operating piston 30 is connected to tank beyond the servo valve throttle by means of chamber 38, diagonal passage 64, passage 84, port 76 opening to the flat surface 66 of the power control device body 14, passages 92 and 94 and port 96 in the servo valve body 68, and conduits 146 and 132. The pressure ahead of the servo valve throttle in the motor return line is thus transmitted to the chamber 40 and the pressure beyond the servo valve throttle is transmitted to chamber 38 to act on opposite sides of the operating piston 30 to operate the same and thus the control piston 24. The land 28 of the power control valve 22 will meter fluid to the motor flowing from passage 58 to 62 across bore 18 while the land 26 of the same control valve will meter fluid in the motor return line flowing from passage 60 to chamber 46 across bore 18. The control piston will modulate to positions for maintaining the pressure drop across the servo valve throttle substantially constant as determined by the resistance of spring 32. When the motor has been operated to the desired position the follow-up linkage from the motor associated with the sleeve 102 will rotate the sleeve and the plug and the sleeve will maintain the relative positions shown in Figures 6 and 7 to stop the motor.

If the plug is operated counterclockwise, the sleeve ports 108 come into communication with the plug port 112 and the sleeve ports 106 are blocked from communication with the plug ports 110. Fluid from the pressure fluid source is conducted to the power control valve device inlet port 52 and across bore 18 to bore 16 and by passage 60, motor port 54, and conduit 142 to the left end of motor 130. Displacement from the motor is conducted by conduit 144 to the motor port 56 of power control device 10 and by passage 62 to bore 16 and chamber 44. From the chamber 44 motor displacement is conducted by passage 82 to the motor return port 78 opening to the flat surface of the power control device body 14, whence by passage 88 of the servo control valve body it is conducted by sleeve ports 108, plug ports 112, hollow portion 118, passages 92 and 94, the tank port 96 and conduits 146 and 132 to the tank 128. The power control valve 22 is operated to the closed position by reason of chamber 38 being connected to tank and a much higher inlet motor pressure being transmitted to the chamber 40 of the valve. The operating piston 30 of the power control valve 20, however, is subjected on one side thereof in the chamber 40 to pressure ahead of the servo valve throttle in the motor return line by motor port 56, bore 16, chamber 44, and longitudinal control piston passage 42. Chamber 38 is connected to tank 128 beyond the servo valve throttle by means of diagonal passage 64, passage 84, port 76, opening to the flat surface 66 of the power control device body 14, passages 92 and 94, and port 96 of the servo valve device 10, and conduits 146 and 132.

With the operating piston 30 of the power control valve 20 being subjected on opposite sides to the pressures ahead of and beyond the servo throttle in the motor return line, the control piston thereof is operated to cause the lands 28 and 26 to assume positions for simultaneously metering fluid to the motor from passages 58 and bore 16 into passage 60 and from the motor through the passage 62 into the chamber 44. The operation of power control valve 20 is identical to that of power control valve 22 previously recited as being responsive to the pressures across the servo valve throttle to maintain the pressure drop thereacross substantially constant for every given opening thereof and in spite of load variations for maintaining the gain of the servo valve constant.

It should be noted that the power control valve device body is designed for mounting thereon either a rotary type of servo valve as illustrated in Figures 1 and 2, or a linear type of servo valve as illustrated in Figures 9, 10 and 11). Three external connection portions are provided in the power control device body adapted for connection to a pressure fluid source and to opposite ends of the servo motor. Fluid from the pressure fluid source is conducted from the pressure delivery inlet port through the device to one of the motor ports, and fluid from the motor is adapted to be returned to the remaining motor port. The power control device body is provided with a flat mounting surface having three passages opening thereto, two of which are passages associated with the power control valves and connected to the external connection motor ports and the other of which is a tank passage for the purpose of connecting the chambers of the two power control valves to the tank. A servo valve body having a mating flat surface may be mounted on the power control device body which has three passages opening to the mating flat surface comprising two motor return passages and a tank passage. Only one external connection port is needed in the servo valve body which is adapted to be connected to a return source such as a reservoir. The servo valve mounted on the body of the power control device may be of a conventional type for opening one or the other of the motor return passages to the tank while blocking the remaining motor return port from communication with the tank.

The body construction of the power control device is simply constructed with two parallel longitudinal bores for the mounting of the two power control valves and having two parallel passages leading from the motor ports intersecting both bores with a third passage leading from the pressure delivery port intersecting the two bores between the first mentioned two passages. Three other passages are provided which open to the flat mounting surface of the power control device body two of which lead directly to the end chambers of the power control valve and the third of which leads directly from the diagonal passage connecting the enlarged chambers of the power control valve. The power control valves are of a type that have been used for the identical purposes previously explained. The device is economically constructed and may be utilized with either a rotary or linear type of servo valve where linkage problems of particular applications demand one or the other type of servo valve. The device is also compact for saving space and weight and avoids the prior type of constructions requiring special power control devices for each particular type of servo valve.

While the form of embodiment of the invention as herein disclosed constitutes a preferred form, it is to be understood that other forms might be adopted, all coming within the scope of the claims which follow.

What is claimed is as follows:

1. A constant gain, hydraulic servo control mechanism for use in a hydraulic power transmission system having a pressure fluid source and a fluid motor and comprising a power control device and a servo control device, the power control device comprising a body member having mounted therein a power control valve through which all motor flow must pass, the body member having a flat surface with passages opening thereto interconnected to the power control valve and adapted for mounting thereon servo control valve devices of different types, the servo control device comprising a body member mounted on the flat surface of the power control device body member and having a mating flat surface with passages opening thereto registering with the passage openings of the power control device body, and a servo valve shiftably mounted in the body operable for selectively controlling communication between the servo valve body passages, said servo valve having ranges of operation providing a throttle through which motor flow must pass and the power control valve regulating flow through the servo valve throttle to maintain the gain of the valve substantially constant.

2. A constant gain, hydraulic servo control mechanism for use in a hydraulic power transmission system having a pressure fluid source and a reversible fluid motor and comprising a power control device and a servo control device, the power control device comprising a body member having external connection ports and having mounted therein two power control valves, one being effective in one direction of motor operation and the other being effective in the other direction of motor operation, the body member having a flat surface with passages opening thereto interconnected to the power control valves and to the connection ports and adaptable for mounting thereon servo control devices of different types, the servo valve comprising a body member mounted on the flat surface of the power control device body member and having a mating flat surface with passages opening thereto registering with the passage openings of the power control device body, and a servo valve shiftably mounted in the servo device body operable to selectively control communication between the body passages, said servo valve having ranges of operation providing a throttle through which all motor flow must pass and the power control valves regulating flow through the servo valve throttle to maintain the gain of the valve substantially constant.

3. A constant gain, hydraulic servo control mechanism for use in a hydraulic power transmission system having a pressure fluid source and a reversible fluid motor and comprising two power control valves for regulating flow to and from the motor, one being effective in one direction of motor operation and the other in the opposite direction of motor operation, and a servo valve for controlling the directional operation of the motor and having a range of operation providing a throttle for each end of the motor, and a two section valve block with external connection ports adapted for connection to the pressure fluid source and to opposite ends of the motor, the power control valves being mounted in one section and the servo valve being mounted in the other section, the one section having a flat mounting surface with passages opening thereto interconnected to the power control valves and to the external connection ports of the one section, and the other section having a mating flat mounting surface having passages opening thereto registering with the one section passage openings and controlled by the servo valve, said power control valves being actuated in response to pressures across the servo valve throttle to maintain the gain of the servo valve substantially constant.

4. A constant gain servo control mechanism for use in a hydraulic power transmission system having a pressure fluid source and a servo motor and comprising a power control device of the type having two power control valves responsive to the pressures across a servo valve throttle to regulate the pressure drop thereacross and thus regulate the gain of the servo valve, one of said valves being effective in one direction of motor operation and the other valve being effective in the other direction of motor operation, the body member having external connection pressure inlet and motor ports adapted respectively for connection to the pressure fluid source and to opposite ends of the motor and being interconnected to the power control valves, a flat mounting surface on the body having three passages opening thereto leading to the power control valves, two of said passages being motor return passages and the other of said passages being a tank passage, a servo valve device comprising a body member having a mating flat surface and mounted on the power control device body, said body member having three passages opening to the flat mounting surface thereof and registering with the passages opening to the power control device mounting surface, one of which is adapted for connection to a tank, and a servo valve shiftably mounted in the body for connecting one or the other of the remaining two passages to the first passage, said servo valve having ranges of operation providing a throttle for each of the remaining two passages.

5. A constant gain servo control mechanism for use in a hydraulic power transmission system having a pressure fluid source and a servo motor and comprising a power control device of the type having two power control valves responsive to the pressures across a servo valve throttle to regulate the pressure drop thereacross and thus regulate the gain of the servo valve, one of said valves being effective in one direction of motor operation and the other valve being effective in the other direction of motor operation, the body member having external connection pressure inlet and motor ports adapted respectively for connection to the pressure fluid source and to opposite ends of the motor and being interconnected to the power control valves, a flat mounting surface on the body adaptable for mounting thereon servo valves of different types and having three passages opening thereto leading to the power control valves, two of said passages being motor return passages and the other of said passages being a tank passage, and a servo valve device mounted on the flat mounting surface of the power control device body for selectively connecting one or the other of the said two power control device body passages to a return source, said servo valve device comprising a body member having a mating flat surface with passages opening thereto registering with the passage openings of the power control device body, and a servo valve in the body member selectively operable for controlling intercommunication between the passages and providing a throttle for motor return fluid in either direction of motor operation.

6. A constant gain servo control mechanism for use in a hydraulic power transmission system having a pressure fluid source and a servo motor and comprising a power control device of the type having two power control valves for regulating flow to and from the motor and responsive to the pressures across a servo valve throttle to regulate the pressure drop thereacross and thus to regulate the gain of the servo valve, one power control valve being effective in one direction of motor operation and the other power control valve in the other direction of motor operation, a body for housing the power control valves having external connection pressure inlet and motor ports respectively adapted for connection to the pressure fluid source and to opposite ends of the motor and interconnected to the power control valves, a flat surface on the body having three passages opening thereto for mounting servo valves of different types, said passages being connected to the power control valves, one of said passages being a tank passage and the remaining two passages being motor return passages, a servo valve device comprising a body member having a mating flat surface and mounted on the power control device body, said servo valve having three passages opening to the flat mounting surface thereof and registering with the passages opening to the power control device mounting surface one of which is adapted for connection to a tank, and a servo valve shiftably mounted in the body for connecting one or the other of the remaining two passages to the first passage, said servo valve having ranges of operation providing a throttle for each of the remaining two passages.

7. For use in a hydraulic power transmission system having a pressure fluid source and a servo motor, a constant gain servo control mechanism comprising a power control device of the type comprising a body member having shiftably mounted therein two power control valves for simultaneously regulating fluid flow to and from the motor, one valve being effective in one direction of motor operation and the other valve in the other direction of motor operation and each valve having resiliently biased operating means adapted for exposure on opposite sides thereof to a throttle pressure differential for operating the valve, external connection pressure inlet and motor ports in the body interconnected to the power control valves and respectively adapted for connection to the pressure fluid source and to opposite ends of the motor, a flat surface formed on the body for mounting servo valve devices of different types and having three passages opening thereto, one of which is connected to one side of both operating means and the others of which are separately connected to the other side of the two power control valve operating means and to the motor ports, and a servo valve device comprising a body member mounted on the power control device body, the servo valve body having a flat surface mating with the flat surface of the power control device body and having three passages opening to the flat surface thereof registering with the power control device body passage openings, an external connection tank port for one of the passages, and a servo valve shiftably mounted in the body for selectively connecting the passage having the tank connection port to one or the other of the remaining two passages, said servo valve having ranges of operation providing a throttle for each of the remaining two passages.

8. For use in a hydraulic power transmission system having a pressure fluid source and a servo motor, a power control device of the type comprising a body member having two power control valves shiftably mounted therein, each valve having resiliently biased operating means, one valve being effective to regulate fluid flow to and from the motor in one direction of motor operation in response to pressures on opposite sides of the operating means and the other valve being likewise effective in the opposite direction of motor operation, said body having external connection pressure inlet and motor ports respectively adapted for connection to the pressure fluid source and to opposite ends of the motor and interconnected to the power control valves, a flat mounting surface on the body and three passages opening to the mounting surface, one of said passages being connected to one side of both valve operating means and the other two passages being separately connected to the motor ports and to the opposite sides of the valve operating means, said other two passages being adapted to conduct return fluid from the motor across one or the other of the power control valves to their respective mounting surface openings, and a servo valve device comprising a body having a servo valve shiftably mounted therein and mounted on the power control device body, said servo valve device body having a mating flat mounting surface with three passages opening thereto, one of said passages which registers with the power control device passage opening which leads to one side of both power control valve operating means having an external connection port, said servo valve being selectively operable to connect one or the other of the remaining passages to the passage having the connection port, and said servo valve having ranges of operation providing a variable throttle for each of the remaining two passages.

9. A power control device for use in constant gain, hydraulic servo control systems including a pressure fluid source and a fluid motor and comprising: in combination a body member having mounted therein a power control valve through which all motor flow must pass and of the type which is operable in response to the pressures ahead of and beyond a throttle, the opening of which is controlled by operation of a servo valve for maintaining the gain of the servo valve constant, said body member having external connection ports connected to the power control valve and being adapted for connection to the pressure fluid source and to the motor, a flat mounting surface on the body member, a pair of motor return passages connected to the power control valve, each motor return passage opening to the flat mounting surface and either of which is adapted to be closed from communication with a return source for controlling the directional operation of the motor, whereby servo valve devices of different types may be mounted on the flat mounting surface of the power control device, said servo valve devices including a body member having a flat mating mounting surface with motor return passages opening thereto adapted to register with the motor return passage openings on the mounting surface of the power control device body.

10. A power control device for use in constant gain, hydraulic servo control systems including a pressure fluid source and a fluid motor and comprising: in combination a body member having mounted therein a power control valve through which all motor flow must pass and of the type which is operable in response to the pressures ahead of and beyond a throttle the opening of which is controlled by operation of a servo valve for maintaining the gain of the servo valve constant, said body member having external connection ports connected to the power control valve and being adapted for connection to the pressure fluid source and to the motor, a flat mounting surface on the body member, a pair of motor return passages connected to the power control valve, each of which opens to the flat mounting surface and either of which is adapted to be closed from communication with a return source for controlling the directional operation of the motor, whereby servo valve devices of different types may be mounted on the flat mounting surface of the power control device, a servo valve device mounted on the power control device, said servo valve device including a body member having a flat mating mounting surface, and motor return passages in said body member opening to the flat mounting surface thereof and registering with the motor return passage openings on the mounting surface of the power control device body.

11. A power control device for use in constant gain, hydraulic servo control systems including a pressure fluid source and a fluid motor and comprising: in combination a body member having mounted therein two power control valves one of which is effective in one direction of motor operation and the other being effective in the other direction of motor operation to control the flow of fluid to and from the motor, each power control valve being of the type which is operable in response to the pressures ahead of and beyond a throttle the opening of which is controlled by operation of a servo valve for maintaining the gain of the servo valve constant, said body member having external connection ports leading to the power control valve and being adapted for connection to the pressure fluid source and to the motor, a flat mounting surface on the body member, a pair of motor return passages separately connected to the power control valve and opening to the flat mounting surface whereby servo valve devices of different types may be mounted on the flat mounting surface, a servo valve device mounted on the power control device body, said servo valve device including a body member having a flat mating mounting surface, and motor return passages in said body member opening to the flat mounting surface thereof and registering with the motor return passage openings on the mounting surface of the power control device body.

References Cited in the file of this patent

UNITED STATES PATENTS

| 2,578,676 | Dean | Dec. 18, 1951 |
| 2,635,584 | Jacques | Apr. 21, 1953 |